United States Patent [19]

Minor et al.

[11] Patent Number: 4,768,046

[45] Date of Patent: Aug. 30, 1988

[54] DOT PRINTER WITH TONER CHARACTERISTIC COMPENSATION MEANS

[75] Inventors: James C. Minor; Orville C. Rodenberg, both of Rochester, N.Y.

[73] Assignee: Eastman Kodak Company, Rochester, N.Y.

[21] Appl. No.: 111,946

[22] Filed: Oct. 23, 1987

[51] Int. Cl.[4] ............................................ G01D 15/00
[52] U.S. Cl. .................................. 346/160.1; 346/157
[58] Field of Search ...................... 346/157, 160.1, 153, 346/154; 355/3 CH, 14 CH, 4; 101/DIG. 13; 400/119; 358/300

[56] References Cited

U.S. PATENT DOCUMENTS

| | | | |
|---|---|---|---|
| 4,106,870 | 8/1978 | Kondo et al. | 355/4 |
| 4,137,537 | 1/1979 | Takahashi et al. | 346/160.1 |
| 4,205,322 | 5/1980 | Tsuzuki et al. | 346/160.1 |
| 4,515,462 | 5/1985 | Yoneda | 355/4 |
| 4,525,729 | 6/1985 | Agulnek et al. | 346/154 |

Primary Examiner—Arthur G. Evans
Attorney, Agent, or Firm—Milton S. Sales

[57] ABSTRACT

In multi-color reversal development, good color balance is obtained by changing the time duration of exposure for each different color frame. A dot printer apparatus produces a series of different color-resolved electrostatic latent images on a recording member. The apparatus includes an array of discrete elements for dot recording on the recording medium. The elements are selectively enable for predetermined periods of time during a cycle of operation to form a color-resolved electrostatic latent image on the recording member. Each charge latent image is developed with selected toner particles according to its resolved color. A control signal representative at least in part of the resolved color of each latent image is produced, and the control signal determines the enablement time of the elements during each cycle of operation according to each resolved color.

5 Claims, 4 Drawing Sheets

DOT PRINTER WITH TONER CHARACTERISTIC COMPENSATION MEANS

BACKGROUND OF THE INVENTION

1. Field of the Invention

The present invention relates to non-impact printing apparatus for printing characters, halftone images and the like with small picture elements (pixels) or dots.

2. Description of the Prior Art

In the prior art (as exemplified by U.S. Pat. No. 4,596,995) dot printers employing recording elements such as stylus, laser, ink jet, light emitting diodes (LED's), and the like are known. As an example, LED print apparatus comprise a multiplicity of individually addressable, point-like radiation sources that are arranged in a row or rows for exposing points upon a recording medium during movement of the photoreceptor relative to, and in a direction normal to, the row or rows. Driver circuits are provided for simultaneously energizing the radiation sources responsive to respective image or data bit input signals applied to the driver circuits during an information line period.

Usually, electrophotography produces positive prints when the original subject matter is in the positive form. However, for dot printers, it is often convenient to produce positive prints from negative exposure by so called "reversal" development. In reversal development, a recording medium is charged to a uniform unexposed primary voltage $V_0$ and image-wise discharged to an exposure voltage $V_E$. The exposed areas of the recording medium are toned at a development station having a bias voltage $V_B$. The difference between $V_0$ and $V_B$ is carefully maintained at a constant value to inhibit both background images and developer pickup. The difference between $V_0$ and $V_E$, herein referred to as $\Delta V$, is a factor in determining the image density.

Another factor in determining image density is the charge-to-mass ratio of the toner particles. For the same $\Delta V$, image density varies inversely with toner charge-to-mass ratio. This is of concern in multi-color machines since each color toner generally has a different charge to mass ratio and will therefore tone differently from other colors. If uncompensated for, this will cause a color imbalance in the final print.

One form of such compensation entails changing $\Delta V$ between frames of different color-resolved latent images by adjusting the primary charge $V_0$ in the interframe. For example, the recording medium is charged to a fixed value and then, according to the color-resolved latent image for the frame, the charge is reduced appropriately by means of a light source such as an electroluminescent panel. FIG. 1 is a graph of photoconductor voltage verses relative exposure for constant exposure and three values of $V_0$ (i.e., 400 volts, 500 volts, and 600 volts).

At low levels of exposure (position "A" of FIG. 1), there is very little change in $\Delta V$ as $V_0$ changes between 400, 500, and 600 volts, and therefore inadequate compensation for changes in charge-to-mass ratio. At higher levels of exposure (position "B"), there would be adequate change in $\Delta V$, but the increased exposure requires more energy, and undesirably results in broader line widths.

Other disadvantages of the system desribed is the cost of the voltage-reducing light source (the electroluminescent panel) and its power supply. Further, since the bias voltage $V_B$ must follow $V_0$, there must be as many $V_B$ power supplies as there are color development stations, or there must be a programable power supply, and the latter is as expensive as several constant-power supplies.

SUMMARY OF THE INVENTION

We have found that in multi-color reversal development, good color balance can be obtained by changing the time duration of exposure for each different color frame rather than by changing the level of primary voltage $V_0$. Advantages of this include the elimination of the need for a voltage-trimming light source and its power supply. Once $V_B$ is set, it can be kept constant. Therefore a single, nonprogrammable power supply may be used for all color development stations. Further, there is no risk that there will be developer pickup if $V_B$ does not exactly track $V_0$.

According to the present invention, a dot printer apparatus produces a series of different color-resolved electrostatic latent images on a recording member. The apparatus includes an array of discrete elements for dot recording on the recording medium. Driving means selectively enable the elements for predetermined periods of time during a cycle of operation to form a color-resolved electrostatic latent image on the recording member. Each charge latent image is developed with selected toner particles according to its resolved color. A control signal representative at least in part of the resolved color of each latent image is produced, and means responsive to the control signal determines the enablment time of the elements during each cycle of operation according to each resolved other.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

The apparatus of the preferred embodiment will be described in accordance with an electrophotographic recording member. The invention, however, is not limited to apparatus for creating images on such a member, as other media such as photographic film etc. may also be used with the invention.

Because electrophotographic reproduction apparatus are well known, the present description will be directed in particular to elements forming part of or cooperating more directly with the present invention. Apparatus not specifically shown or described herein are selectable from those known in the prior art.

Figure 2:
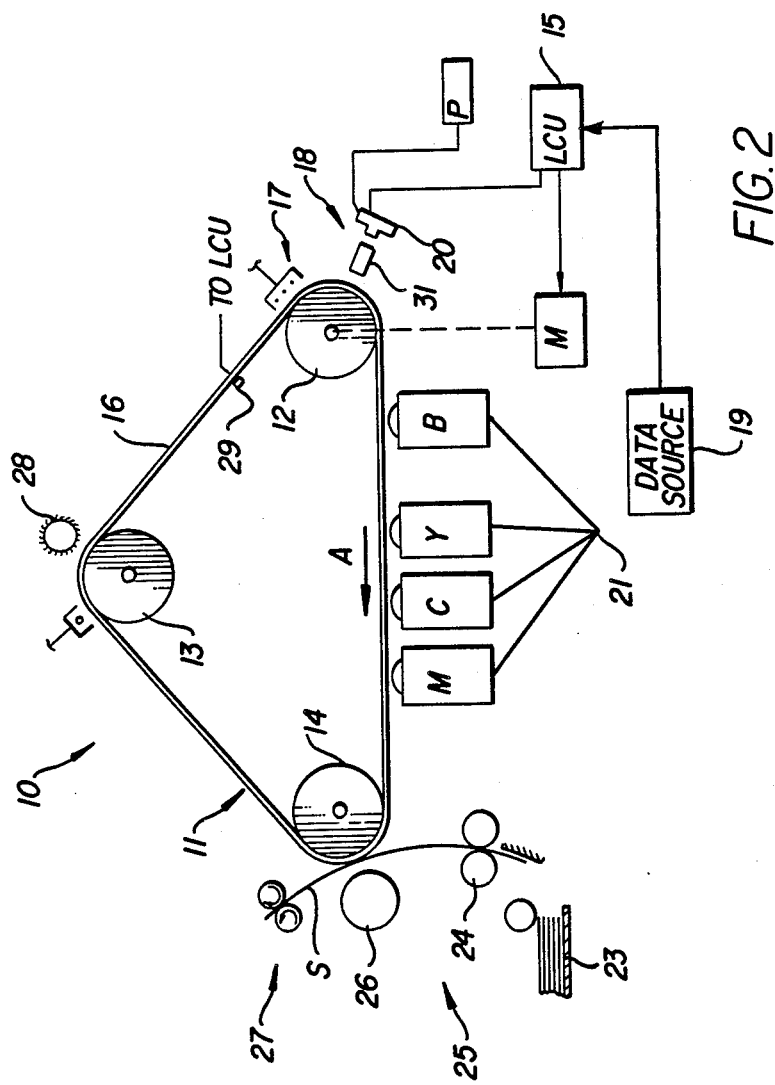
FIG. 2 is a schematic of a print apparatus in accordance with the invention.

With reference now to FIG. 2, an electrophotographic reproduction apparatus 10 includes a recording member such as a photoconductive web 11 or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a logic and control unit (LCU) 15. When the switch is closed, roller 12 is driven by motor M and moves web 11 in clockwise direction as indicated by arrow "A". This movement causes successive image area of web 11 to sequentially pass a series of electrophotographic work stations of the reproduction apparatus.

The work stations include a charging station 17 at which the photoconductive surface 16 of the web 11 is sensitized by applying a uniform electrostatic primary charge $V_0$ of a predetermined voltage. An exposure station 18 forms a series of different color-resolved electrostatic latent images by modulating the primary charge on an image area of the surface 16 with selectively enabled discrete elements for dot recording in accordance with color-resolved control signals provided by a data source 19. The point-like elements are supported in a print head 20.

The selectively enablable elements are preferably radiation sources such as LED's. Optical means 31 may be provided for focusing light from each of the LED's onto a transverse line on the photoconductive surface.

A four-color development station 21 includes developer which may consist of iron carrier particles and electroscopic toner particles with an electrostatic charge. Developer with appropriately colored toner is brushed over photoconductive surface 16 of the web 11, and toner particles adhere to the color-resolved latent electrostatic image to form a visible toner image.

A copy sheet S is fed from a supply 23 to drive rollers 24, which then urge the sheet to move forward onto web 11 in alignment with a color-resolved toner image at a transfer station 25. At a roller 26, the toner image on web 11 is transferred to copy sheet S. If additional color-resolved toner images are to be transfered to sheet S, the sheet is held on roller 26 and brought back into contact with web 11 in register with subsequent toner images. After the transfer of all unfixed toner images to a copy sheet S, the sheet is transported to a heated pressure roller fuser 27 where the image is fixed to the copy sheet At a cleaning station 28, the photoconductive surface 16 of the web 11 is cleaned of any residual toner particles remaining after the toner images have been transferred.

Web 11 has a plurality of indicia such as perforations along one of its edges to coordinate operation of the various work stations 17, 18, 21, and 25 with movement of the image areas on the web. These perforations generally are spaced equidistantly along the edge of web 11. At a fixed location along the path of web movement, there is provided suitable means 29 for sensing web perforations. This sensing produces input signals to LCU 15 which has a digital computer, preferably a microprocessor. The microprocessor has a stored program responsive to the input signals for sequentially actuating, then deactuating the work stations as well as for controlling the operation of any other machine functions. Additional encoding means may be provided as known in the art for providing more precise timing signals for control of the various functions of the apparatus 10.

Programming of a number of commercially available microprocessors is a conventional skill well understood in the art. This disclosure is written to enable to programmer having ordinary skill in the art to produce an appropriate control program for the one or more microprocessors used in this apparatus. The particular details of any such program would, of course, depend on the architecture of the designated microprocessor.

Figure 3:
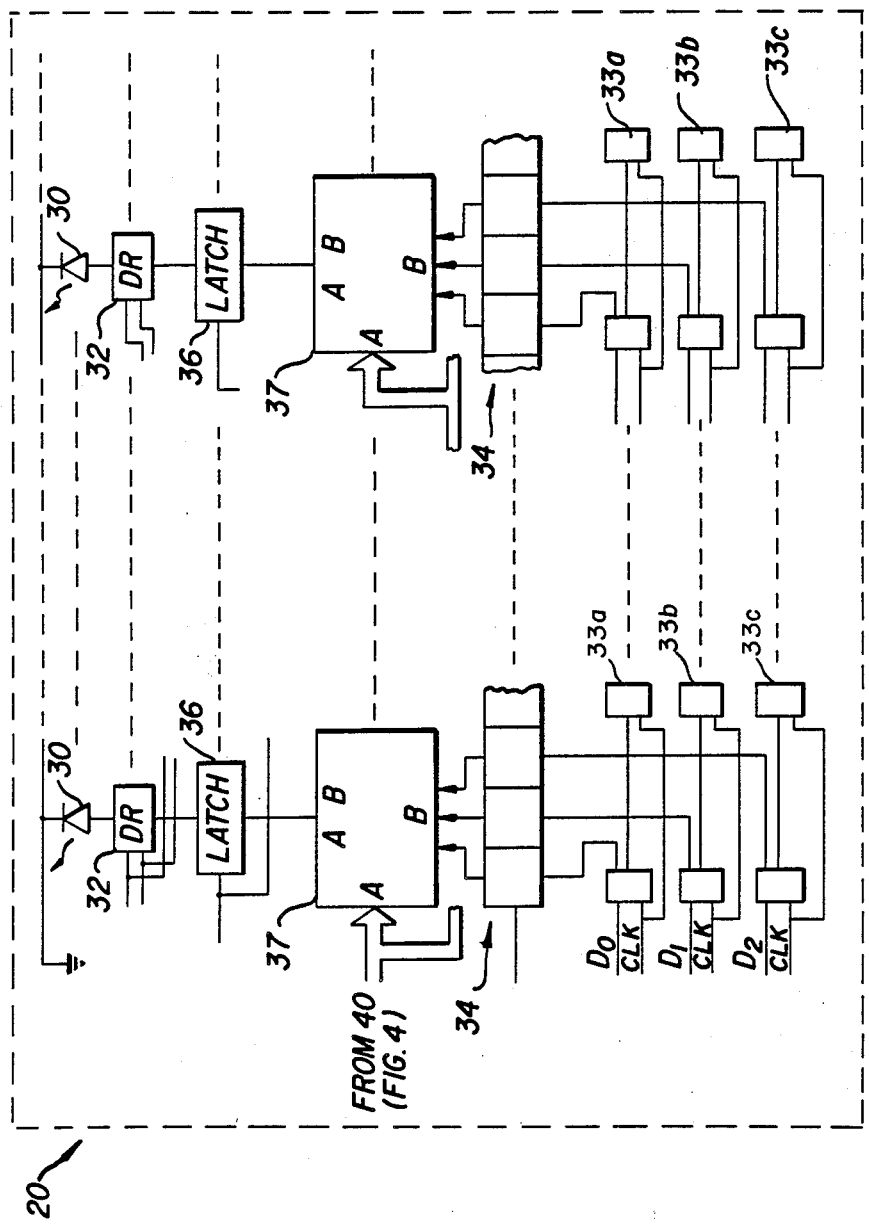
FIG. 3 is a block diagram of a driver circuit for use in the print apparatus of FIG. 2.

With reference to FIG. 3, print head 20 comprises a suitable support with a series of LED's arranged in a rwo so that the LED's (only two of which are shown) extend across the width of web 11. Associated with each LED is a driver circuit 32 to provide current from a power source "P" (FIG. 2) for illuminating the LED during each cycle of operation for an enablement time period required for forming a pixel or recording dot on web 11.

The duration of the enablement time is determined by control signals $D_0$, $D_1$, and $D_2$. The control signal for each LED comprises a multi-bit signal that is representative at least in part of the color of the toner to be applied to the latent image. The control signal may also be representative of the pixel size or gray scale density to be recorded by the LED on web 11.

The use of three bits of data for each pixel allows for eight pixel size variations (including no size, i.e. no illumination by the LED). For each LED, three serial shift registers 33a, 33b, and 33c are used to store each of the data bits. Rasterized data in the form of binary logic signal ones or zeros is serially shifted down each of shift registers 33a, 33b, and 33c under control of clock pulses until all shift registers are full. A latch signal then enables a three-bit latch register 34 associated with each LED to latch the output of the shift registers.

The multi-bit output of latch registers 34 are now compared in a comparator 37 with a descending count from an up/down counter 40 (FIG. 4) that is under clock control. The counter will count down from decimal eight. When there is a match between the outputs of counter 40 and three-bit latch register 34 for that LED, a latch 36 is enabled that causes current driver 32 to initate current to LED 30. A circuit substantially similar to the circuit shown in FIG. 3 is described in U.S. application Ser. No. 000,295, filed in the name of Ayers et al, the contents of which are incorporated by this reference.

Figure 4:
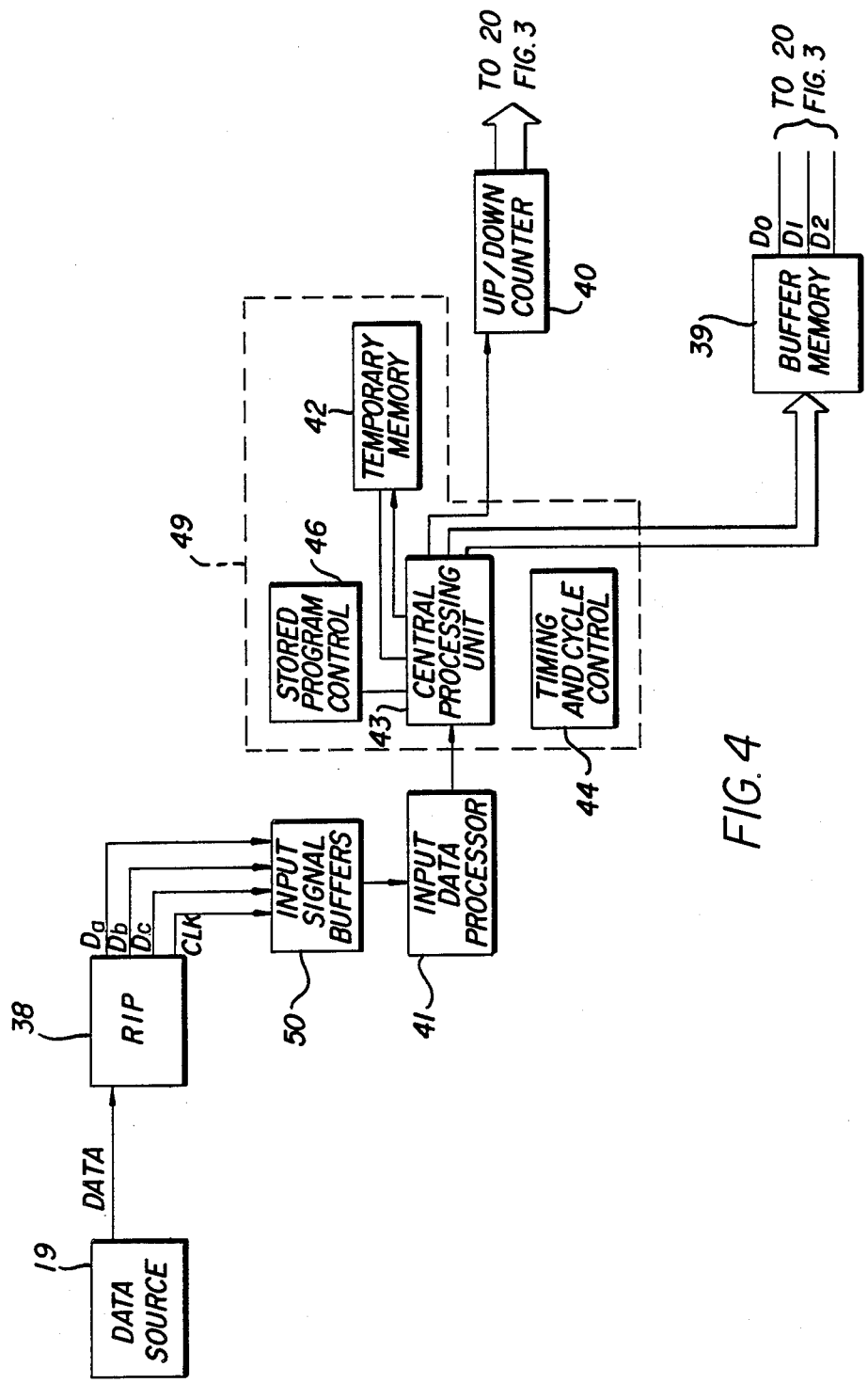
FIG. 4 is a block diagram of circuitry used in the print apparatus of FIG. 2.

FIG. 4 shows the means for providing control signals to print head 20 from a data source 19 which may be a computer, word processor, image scanner, etc. This data is fed to a conventional raster image processor (RIP) 38 which processes the incoming digital coded signals into digital rasterized image data signals $D_a$, $D_b$, $D_c$ suitable for forming the appropriate pixel size mandated by the control signal during a production run or print job.

One or more lines of rasterized image data signals is input to a circuit which may comprise a microcomputer 49 or logic circuit.

The rasterized data is input to a microcomputer 49 through input signal buffers 50 and input data processor 41. The microcomputer includes a central processing unit 43, stored program control 46, temporary memory 42 and timing and cycle control unit 44. In accordance with a program in stored program control 46, the microcompupter examines the image data signals and the color of toner to be used to develope the charge image, and produces a control signal for each LED representative of the image content and the resolved image color.

In the simple case wherein the printing of data is to be of the binary type of printing (i.e., an LED is either on or off), the print head as shown in FIG. 3 may be used, however, in this simple case, the multiple bits of information for each LED are used to determine enablement time of an LED only for toner color compensation. In stored program control memory of the microcomputer there are provided algorithms for calculating an adjustment or correction factor for the LED's based on the toner color. Such an algorithm will be based on experimental observed behavior for the types of LED's and the electrophotographic process used. The algorithm may also have service-adjustable or feedback adjustable parameters for adapting to specific printers. The data for each LED is modified by the adjustment factor. In the example of a binary printer, data from the raster image processor associated with each LED will be either a logic one or zero, depending upon whether an LED is to be illuminated or not illuminated. This data is then provided to the microcomputer which adjusts the data to an enablement time that is appropriate for that color toner. This enablement time is provided as a multi-bit digital signal to memory. The multi-bit signal is then "treated" by the print head as a gray scale data input in accordance with the description provided above for the print head of FIG. 3.

Where the data source provides gray scale data and the printer is to be operated as a true gray scale printer, a multi-bit data signal from the raster image processor has the data for each LED modified by an adjustment based on the toner color. For example, activations where the LED is called to be on for a long duration to form a large pixel are weighted more than activations where the LED is on for only its minimum period. A correction factor is determined and the corrected data sent to memory for printing by the print head of FIG. 3.

Figure 1:
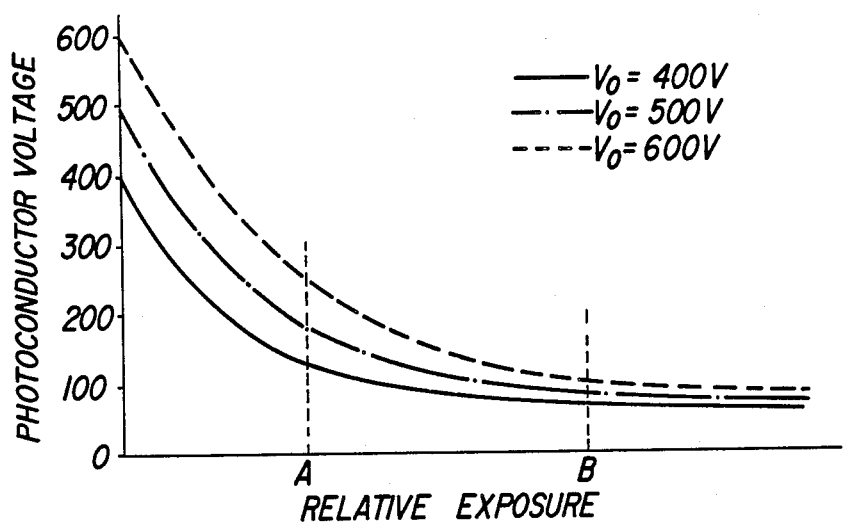
FIG. 1 is a graph of recording member voltage verses relative exposure for various primary voltages, as known in the prior art.
Figure 5:
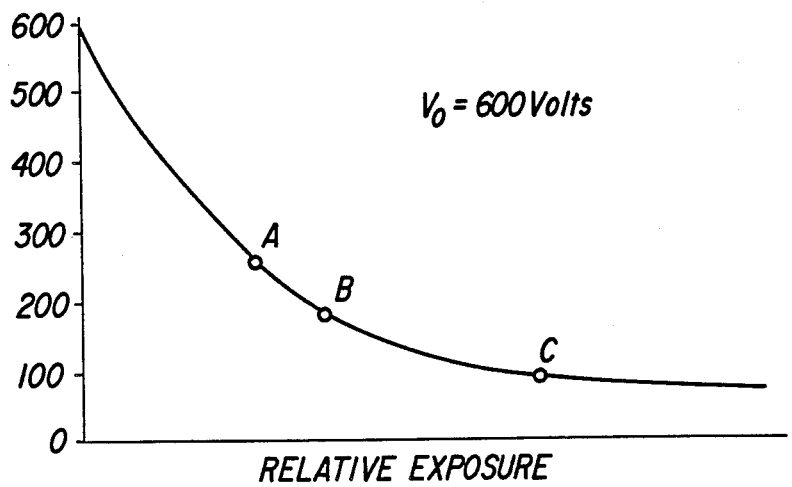
FIG. 5 is a graph of recording member voltage verses relative exposure as in FIG. 1, but in accordance with the present invention.

FIG. 5 is a graph of photoconductor voltage verses relative exposure for constant value (600 volts) of $V_0$ and variable exposure. At low levels of exposure (position "A" of FIG. 5), there is a $\Delta V$ of 340 volts (600−260) At medium exposure (position "B") there is a $\Delta V$ of 420 volts (600−180). Finally, at high exposure (position "C") there is a $\Delta V$ of 500 volts (600−100). Therefore adequate compensation for changes in charge-to-mass ratio are available by changing exposure.

The invention can also be used to compensate for changes in toner charge-to-mass ratio due to changes in the relative humidity, and in conjunction with methods used to compensate for nonuniformaties between LED elements.

The invention is also applicable to other types of recording elements such as stylus, thermal, laser, ink jet, and similar printers.

The invention has been described in detail with particular reference to preferred embodiments thereof. However, it will be understood that variations and modifications may be effected within the spirit and scope of the invention.

We claim:

1. A dot printer apparatus for producing a series of electrostatic latent images on a recording member, said apparatus comprising:
   an array of discrete elements for dot recording on the recording medium;
   driving means for selectively enabling the elements for predetermined periods of time during a cycle of operation to form an electrostatic latent image on the recording member;
   means for developing the latent image with toner particles;
   means for producing a control signal representative at least in part of the charge-to-mass ratio of the toner particles and
   means responsive to said control signal for determining the enablment time of the elements during each cycle of operation according to the charge-to-mass ratio of the toner particles.

2. A dot printer apparatus for producing a series of different color-resolved electrostatic latent images on a recording member, said apparatus comprising:
   an array of discrete elements for dot recording on the recording medium;
   driving means for selectively enabling the elements for predetermined periods of time during a cycle of operation to form a color-resolved, electrostatic latent image on the recording member;
   means for developing each latent image with selected toner particles according to its resolved color;
   means for producing a control signal representative at least in part of the resolved color of each latent image; and
   means responsive to said control signal for determining the enablement time of the elements during each each cycle of operation according to each resolved color.

3. A dot printer apparatus as defined in claim 2 wheren the recording elements are light emitting diodes.

4. A dot printer apparatus comprising:
   a recording head having a plurality of recording elements for dot recording on a recording medium during a production run;
   driving means for driving each of said recording elements in accordance with respective control signals for forming an image during the production run; and
   means for providing control signals representative at least in part of the resolved color of the image for correction errors in color balance due to differences in charge-to-mass ratios between different color toners.

5. The apparatus of claim 4 wherein the recording elements are light-emitting diodes.

* * * * *